Patented Mar. 22, 1938

2,111,829

UNITED STATES PATENT OFFICE 2,111,829

ORIENTATION COMPASS

Franz Winterer and Karl Stadler,
Vienna, Austria

Application April 1, 1937, Serial No. 134,283
In Austria April 3, 1936

3 Claims. (Cl. 33—72)

The invention relates to an orientation compass which is adjustable to the text on the card or to some other basic direction. For sighting in open country the compass according to the invention has a hair cross and a diopter slit in the lid for rising sight-lines to far distances, and a diopter adjustment of the lid-mirror for near distances. The skirt-like covering of the casing of the compass needle rotatably mounted in the compass case brings the plane of its angle scale into the plane of movement of the compass needle.

The fundamental characteristic of the invention is, that the lower covering of the rotatable compass needle casing has a transparent plate with lattice screen parallel to the west-east and north-south direction of the degree or graduation scale, the bed of the compass comprises a mirror foldable through an angle of at least 250° and having a diopter slit and provided with a hair-cross sighting device, and that the points of the compass needle are situated at the height of the reading scale.

An embodiment of the invention is illustrated in the accompanying drawing, in which:—

Figure 1:
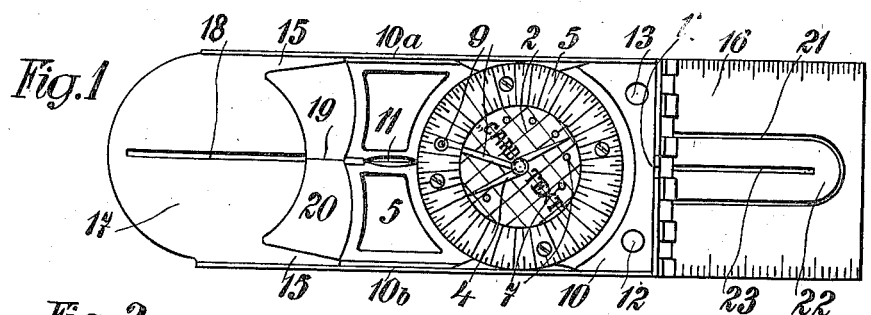
Fig. 1 shows the compass in top plan view and Fig. 2 is a longitudinal section of Fig. 1.
Figure 2:
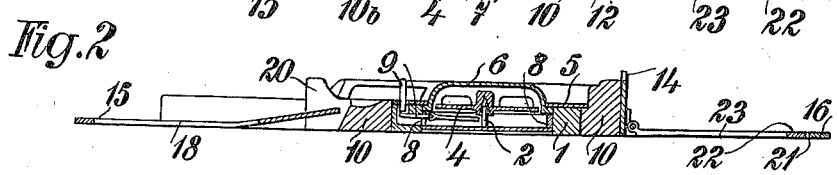

The compass comprises a compass needle casing 1 with transparent base plate carrying an orthogonal screen for setting to some basic direction. The scale ring 5 is rigidly connected with the lattice screen plate in such a manner, that the line of said plate extending under the word "Card-text" printed on the said base plate coincides with the west-east diameter of the scale ring 5. The transparent cap 6 covering the compass needle casing and having setting graduations 7 for the point of the compass needle, rests on a spacing ring 8 and is held by means of the scale ring 5. The device 9 for stopping the compass needle becomes operative when the lid 15 is closed. The casing 1 for the compass needle is rotatably fitted in a bedding 10. The bedding 10 has a reading mark 11 which extends up to the graduation of the scale 5. A screw-threaded tripod socket 12 and a hole 13 for fitting on a stick are also provided to enable a steady support to be obtained when sighting in open country. The compass has an upper lid 15 on the inner side of which a mirror 17 is arranged for checking the position of the compass needle when sighting in open country. The lid 15 has further a sighting slit 18 and in the extension of the axis a thread 19 or a vertical thin plate 20 extending into a split sight. The compass also has a lower lid 16 made in two parts and having a slot 21 in which a tongue 22 is arranged which is oscillatable about the same axis and has a diopter slit 23. The sighting is carried out either over the rear or crutch sight 14 or through the slit 23 in tongue 22 towards the front sighting element.

For ascertaining a direction on a map the compass is adjusted by bringing the bearing edge 10a or 10b of the compass bed 10 into the direction and turning the west-east screen lines of the transparent plate 2 parallel to the card text so that the word "Card-text" and also the card text itself is legible.

When setting the compass to some other basic direction—not to the card text and not to the north direction—the bearing edge 10a or 10b of the compass bed 10 is also set to some sighting line but then the north-south screen lines are turned so that they extend in the same direction as the initial direction marked on the card (auxiliary point of vision as place where the instrument is standing).

The compass is further arranged for tripod-sighting and for sighting by hand of the most various kinds.

Figure 3:
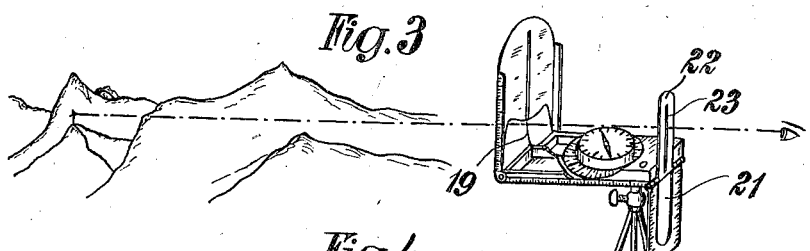
Fig. 3 illustrates in perspective view the compass in position for a diopter sighting.
Figure 4:
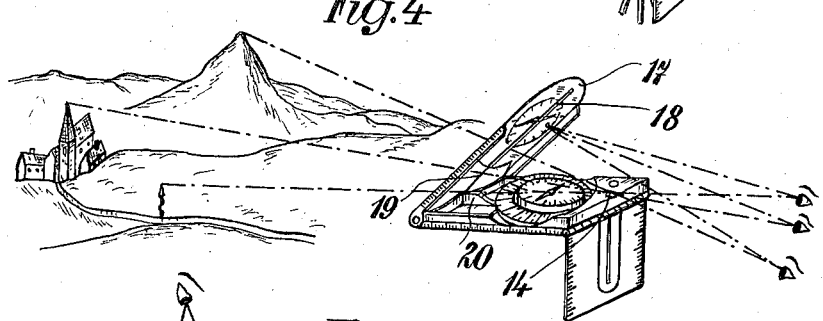
Fig. 4 is a similar view to Fig. 3 showing the compass in position for hair-cross and inclined sighting with simultaneous observation in the mirror of the play of the compass needle.
Figure 5:
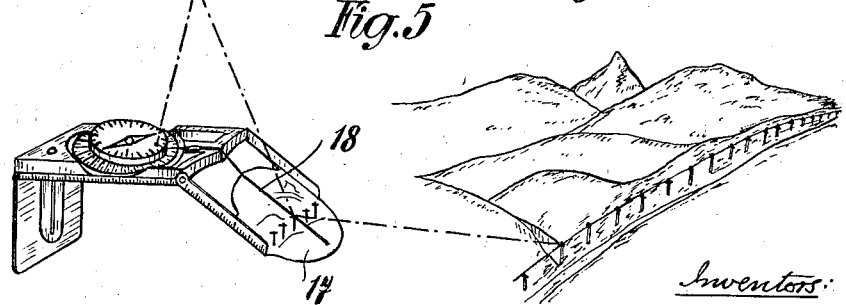
Fig. 5 is a similar view showing the compass in position for a mirror-diopter slit-sighting with direct observation of the compass needle.

Fig. 3 shows an accurate diopter sighting on the tripod with vertically adjusted lid 15 and tongue 22. The sighting is here effected through the slit 23 over the tread 19. Fig. 4 illustrates hand-sightings namely an oblique sighting by means of the crutch sight 14 and the slit 18 of the lid 15 set at an angle, and a horizontal sighting by means of the crutch sight 14 and the thread 19. Fig. 5 shows a hand-sighting whilst marching, the compass needle being observed from above. The sighting in the direction of marching is effected through the mirror 17 with the aid of the slit 18 of the downward folded lid 15.

The checking to see that the compass is being held in the horizontal position is effected in all four kinds of sighting in that the play of the compass needle points is maintained at the height of the scale ring 5. For this reason the transparent cap 6 is domed to allow room for the play of the compass needle 4.

What we claim is:—

1. An orientation compass, in which the rotatable compass needle casing has a transparent base plate carrying an orthogonal screening for setting to some basic direction, the lines of this screen being parallel to the west-east and north-south direction of the degree- or graduation scale.

2. An orientation compass comprising a rotatable compass needle casing having a transparent plate with lattice screen parallel to the west-east and north-south direction of the degree-or graduation scale, and a compass bed having a lid foldable through an angle of at least 240° with mirror foil and having a diopter slit in the extension of which a thread is provided for sighting.

3. An orientation compass comprising a rotatable compass needle casing having a transparent plate with lattice screen parallel to the west-east and north-south direction of the degree- or graduation scale, and a compass bed having a lid foldable through an angle of at least 240° with mirror foil and having a diopter slit in the extension of which a thin vertical plate is provided for sighting.

FRANZ WINTERER.
KARL STADLER.